March 29, 1966 D. W. SCHMERLING 3,243,571
SPATTER GUARD FOR ARC WELDING NOZZLE CONTACT TUBE
Filed Oct. 11, 1963
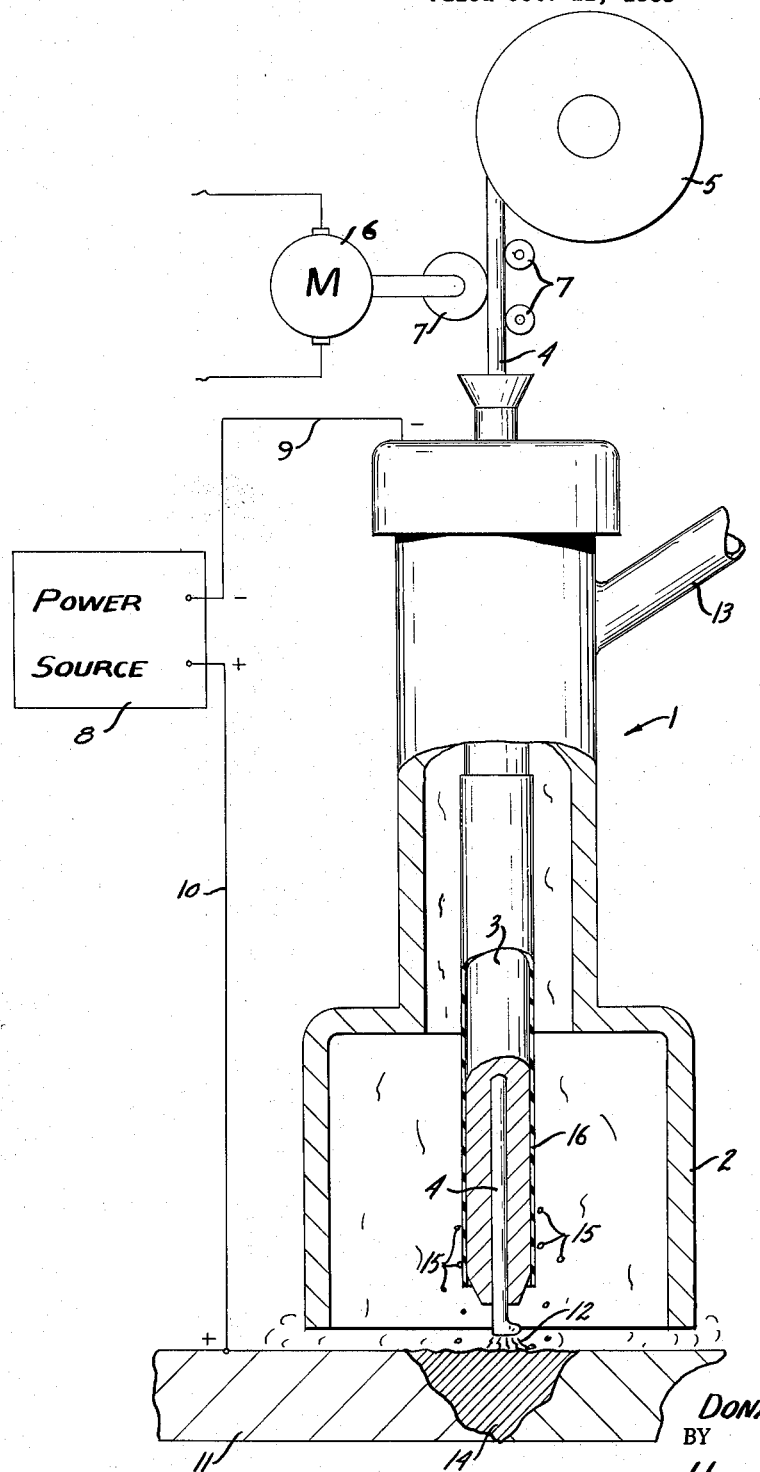
INVENTOR.
DONALD W. SCHMERLING
BY
Howard J Barnett
Attorney 3,243,571
SPATTER GUARD FOR ARC WELDING
NOZZLE CONTACT TUBE
Donald W. Schmerling, Fontana, Wis., assignor to A. O. Smith Corporation, Milwaukee, Wis., a corporation of New York
Filed Oct. 11, 1963, Ser. No. 315,539
1 Claim. (Cl. 219—130)

This invention is directed to a spatter guard to protect an arc welding nozzle contact tube from weld spatter, and more particularly, to the combination in which an insulating elastic sleeve is disposed around the exposed portion of the contact tube to protect it from metal spatter which is ejected from the weld puddle during arc welding. The addition of the insulating sleeve provides a simple means for preventing electrical shorting due to spatter accumulation, and prolongs the useful life of the contact tube.

In consumable arc welding processes, particularly where $CO_2$ shielding gas is used, the explosive arc characteristics cause molten metal droplets to be projected from the arc in all directions. The spatter phenomena is most pronounced when the consumable arc welding electrode is connected in a direct current electrical circuit in which the electrode is the negative pole, or cathode. This is referred to as "straight polarity" arc welding. Spatter from the arc tends to build up on the contact tube, eventually causing electrical short circuits across the nozzle to the workpiece. When this occurs, the contact tube must be removed and replaced. Since the contact tubes are generally copper and require a specific construction, it is most desirable to prolong their useful life as long as possible.

This invention solves the spatter accumulation problem, and provides means for substantially increasing the useful life of the arc welding contact tube. The device is a flexible insulating sleeve adapted to enclose the contact tube and protect it from all metal spatter. The flexible sleeve is easily replaced and requires no special tools to be assembled over the contact tube.

The drawing illustrates arc welding apparatus, including an arc welding nozzle having a portion cut away to show the invention.

In the drawing, the arc welding apparatus includes an arc welding head 1 having a nozzle 2 and a contact tube 3. The contact tube 3 is disposed inside the nozzle 2 and receives a continuous consumable welding electrode 4 therethrough. Electrode 4 is fed into the nozzle 2 and through contact tube 3 from a wire storage reel 5 by means of drive motor 6 which drives the electrode 4 through drive wheels 7. The electrode 4 makes electrical contact in contact tube 3 which is electrically connected through weld nozzle 2 and lead 9 to a welding power source 8. A second electrical lead 10 extends between power source 8 and a workpiece 11 to complete the welding circuit through the workpiece 11 to electrode 4 by means of welding arc 12. The workpiece 11 is shown as the positive or anode terminal for "straight polarity" welding, in which the spatter problem is greater. The workpiece 11 could also be the cathode terminal for "reverse polarity" welding. In addition, the polarity of the workpiece 11 may change during welding, such as when an A.C. welding power source is used. Conduit 13 provides passage means for feeding an arc shielding gas to the vicinity of the arc 12 to protect weld puddle 14 from oxidation.

As shown in the drawing, tiny droplets of metal spatter 15 are ejected from the weld puddle 14 during welding. The contact tube 3 is protected from spatter accumulation by an insulating sleeve 16 which is disposed around the contact tube 3. The sleeve 16 is any flexible, insulating material which can be stretch fitted onto the contact tube. The presently preferred sleeve material is silicone rubber. It is also contemplated that non-woven asbestos, woven glass fibers, asbestos-filled woven nylon, polytetrafluoroethylene, and any flexible insulating material which has a fair degree of heat resistance and which can be fitted over the contact tube 3 could be used to provide protection from weld spatter 15. As the lower portion of the sleeve 16 collects spatter, the sleeve is moved down the contact tube and the spattered portion is cut off, so that the upper, unused portion then protects the contact tube 3 from spatter. After weld spatter 15 has collected on the entire length of sleeve 16, it is removed and replaced with a new sleeve 16.

The method of the invention substantially lengthens the useful life of the copper contact tubes used in electric arc welding.

Various modes of carrying out the invention are contemplated as being within the scope of the following claim particularly pointing out and distinctly claiming the subject matter which is regarded as the invention.

I claim:

The method of protecting an arc welding contact tube from spatter comprising disposing a stretchable insulating sleeve around said contact tube during $CO_2$ gas shielded, continuous consumable electrode arc welding to substantially completely enclose said contact tube therein, and thereafter replacing the spatter-worn portion of said sleeve with a fresh sleeve portion, whereby spatter is prevented from contacting the contact tube, said insulating sleeve being taken from the group consisting of non-woven asbestos, silicone rubber, woven glass fibers, asbestos filled woven nylon and polytetrafluoroethylene.

References Cited by the Examiner
UNITED STATES PATENTS

| 2,549,804 | 4/1951 | Graham | 219—78 |
| 2,795,688 | 6/1957 | McCaffrey | 219—119 |
| 2,827,550 | 3/1958 | Unrath | 219—130 |

RICHARD M. WOOD, *Primary Examiner.*